United States Patent
Goyal

(10) Patent No.: US 9,908,625 B2
(45) Date of Patent: Mar. 6, 2018

(54) OCCUPANT RESTRAINT SYSTEM AND METHOD OF OPERATING

(71) Applicant: Goodrich Aerospace Services Private Limited, Bangalore, Karnataka (IN)

(72) Inventor: Nitin Kumar Goyal, Karnataka (IN)

(73) Assignee: AMI INDUSTRIES, INC., Colorado Springs, CO (US)

( * ) Notice: Subject to any disclaimer, the term of this patent is extended or adjusted under 35 U.S.C. 154(b) by 0 days.

(21) Appl. No.: 14/819,936

(22) Filed: Aug. 6, 2015

(65) Prior Publication Data
US 2017/0036764 A1    Feb. 9, 2017

(51) Int. Cl.
*B64D 11/00* (2006.01)
*B64D 25/02* (2006.01)
*B60R 22/48* (2006.01)

(52) U.S. Cl.
CPC .......... *B64D 11/0015* (2013.01); *B60R 22/48* (2013.01); *B64D 25/02* (2013.01); *B60R 2022/4816* (2013.01); *B60R 2022/4866* (2013.01); *B60R 2022/4883* (2013.01)

(58) Field of Classification Search
CPC ........................... B64D 11/0015; B64D 25/02
USPC ......................................................... 701/45
See application file for complete search history.

(56) References Cited

U.S. PATENT DOCUMENTS

| | | | |
|---|---|---|---|
| 5,555,458 A | 9/1996 | Large | |
| 6,448,907 B1 * | 9/2002 | Naclerio | B64D 25/06 244/122 R |
| 6,888,475 B2 * | 5/2005 | Darr | B60R 22/321 180/268 |
| 8,005,595 B2 | 8/2011 | Marriott et al. | |
| 8,090,504 B2 | 1/2012 | Long et al. | |
| 2003/0160497 A1 | 8/2003 | Darr | |
| 2009/0031541 A1 | 2/2009 | Pribonic | |
| 2009/0112407 A1 * | 4/2009 | Kneller | B64D 11/0015 701/45 |
| 2009/0177357 A1 * | 7/2009 | Long | B60R 22/48 701/45 |

(Continued)

FOREIGN PATENT DOCUMENTS

| | | |
|---|---|---|
| DE | 102004025319 A1 | 12/2005 |
| EP | 2189372 B1 | 6/2012 |
| WO | 2003063105 A1 | 7/2003 |

OTHER PUBLICATIONS

European Search Report for Application No. 16183248.0 dated Dec. 7, 2016.

*Primary Examiner* — Yazan Soofi
(74) *Attorney, Agent, or Firm* — Cantor Colburn LLP

(57) ABSTRACT

An occupant restraint system includes a plurality of occupant residences each including a restraint assembly having a latch mechanism manually movable between a latched state and an unlatched state and an electric lock mechanism movable from an unlocked state to a locked state when the latch mechanism is in the latched state. The control console includes an electronic display of the plurality of occupant residences and a user interface for actuating the electric lock mechanism between the locked state and the unlocked state. An occupancy tabulation system is constructed and arranged to send a signal to the control console indicative of occupied residences of the plurality of occupant residences for displaying an occupied condition associated with the occupied residences on the electronic display.

15 Claims, 3 Drawing Sheets

(56) References Cited

U.S. PATENT DOCUMENTS

2009/0201141 A1    8/2009   Teshome et al.
2010/0101060 A1    4/2010   Walega et al.

* cited by examiner

OCCUPANT RESTRAINT SYSTEM AND METHOD OF OPERATING

BACKGROUND

The present disclosure relates to an occupant restraint system and, more particularly, to an occupant restraint lock status and control system for passenger seats and method of operation.

Traditional seat restraint mechanisms may include pivotally connected bars, chains, belts and other structures that typically include a manual latch for securing an occupant in a seat. Mass transit vehicles may use such seat restraint mechanisms and others to secure a plurality of occupants into a plurality of seats in the vehicle. Non-limiting examples of such vehicles may include buses, amusement rides and aircrafts. For the sake of safety and/or in accordance with government regulations, attendants in such vehicles must visually confirm that each seat restraint mechanism associated with an occupied seat is properly latched, thereby securing the occupant. Such an arrangement may conceivably be compromised since it remains the occupant's prerogative to unlatch the seat restraint mechanism at any given moment without notifying the attendant. A less burdensome means to secure occupants for travel and/or assure occupants are properly restrained during any given moment of travel is desirable.

SUMMARY

An occupant restraint system according to one, non-limiting, embodiment of the present disclosure includes a plurality of occupant residences each including a restraint assembly having a latch mechanism manually movable between a latched state and an unlatched state and an electric lock mechanism movable from an unlocked state to a locked state when the latch mechanism is in the latched state; a control console including an electronic display of the plurality of occupant residences and a user interface for actuating the electric lock mechanism between the locked state and the unlocked state; and an occupancy tabulation system constructed and arranged to send a signal to the control console indicative of occupied residences of the plurality of occupant residences for displaying an occupied condition associated with the occupied residences on the electronic display.

Additionally to the foregoing embodiment, the electric lock mechanism is integrated into the latch mechanism.

In the alternative or additionally thereto, in the foregoing embodiment, the electric lock mechanism is constructed and arranged not to lock when the latch mechanism is in the unlatched state.

In the alternative or additionally thereto, in the foregoing embodiment, the occupancy tabulation system includes a plurality of occupancy sensors with each occupancy sensor associated with a respective one of the plurality of occupant residences, and each occupancy sensor constructed to initiate an occupied signal to the control console.

In the alternative or additionally thereto, in the foregoing embodiment, the occupancy tabulation system includes a bar code reader constructed and arranged to identify each occupant.

In the alternative or additionally thereto, in the foregoing embodiment, the occupancy tabulation system includes a data store that receives input from the bar code reader and a wireless connection for downloading the data store to the control console.

In the alternative or additionally thereto, in the foregoing embodiment, the electric lock mechanism includes an electromagnet.

In the alternative or additionally thereto, in the foregoing embodiment, the restraint assembly includes a flexible belt and a latchable buckle that includes the latch mechanism and the electric lock mechanism.

In the alternative or additionally thereto, in the foregoing embodiment, the plurality of occupant residences is a plurality of airplane seats.

In the alternative or additionally thereto, in the foregoing embodiment, the user interface includes an all-unlock selector for placing all of the electric lock mechanisms in the unlocked state.

In the alternative or additionally thereto, in the foregoing embodiment, the occupant restraint system is generally in a vehicle and the user interface includes a clear selector for clearing all data after travel completion.

In the alternative or additionally thereto, in the foregoing embodiment, the user interface includes a load data selector for loading data from the data store to the control console.

In the alternative or additionally thereto, in the foregoing embodiment, the occupant restraint system includes a processor for receiving and sending control signals from and to the control console and from and to the electric lock mechanism of each one of the plurality of occupant residences.

In the alternative or additionally thereto, in the foregoing embodiment, the processor includes a router having a plurality of ports with each port associated with the electric lock mechanism of a respective one of the plurality of occupant residences.

In the alternative or additionally thereto, in the foregoing embodiment, the occupant restraint system includes a processor for receiving and sending control signals from and to the control console, and wherein the processor includes a router having a plurality of ports with each port associated with the electric lock mechanism of a respective one of the plurality of seats and a respective one of the plurality of occupancy sensors.

A method of operating an occupant restraint system according to another, non-limiting, embodiment includes the steps of identifying occupied seats of the vehicle via an electrical occupancy tabulation system; receiving seat occupancy data from the electrical occupancy tabulation system into a control console via a computer processor; displaying the occupied seats on an electronic display of the control console; notifying occupants to manually place a latch mechanism of a restraint assembly into a latched state; remotely placing a lock mechanism of the restraint assemblies in the latched state into a locked state via a user interface of the control console; and displaying occupied seats that are not in the locked state on the electronic display of the control console.

Additionally to the foregoing embodiment, the method includes the step of notifying the occupant in one of the occupied seats and with a lock mechanism not in the locked state to place the latch mechanism in a latched state.

In the alternative or additionally thereto, in the foregoing embodiment, the method includes the steps of operating a selector on the user interface to place all lock mechanisms in an unlocked state; manually placing the latch mechanism into an unlatched state by the occupant; and disembarking from the occupied seat by the occupant.

In the alternative or additionally thereto, in the foregoing embodiment, the electrical occupancy tabulation system includes a bar scanner that inputs data into a data store.

In the alternative or additionally thereto, in the foregoing embodiment, the electrical occupancy tabulation system includes an occupancy sensor placed in each one of a plurality of seats.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
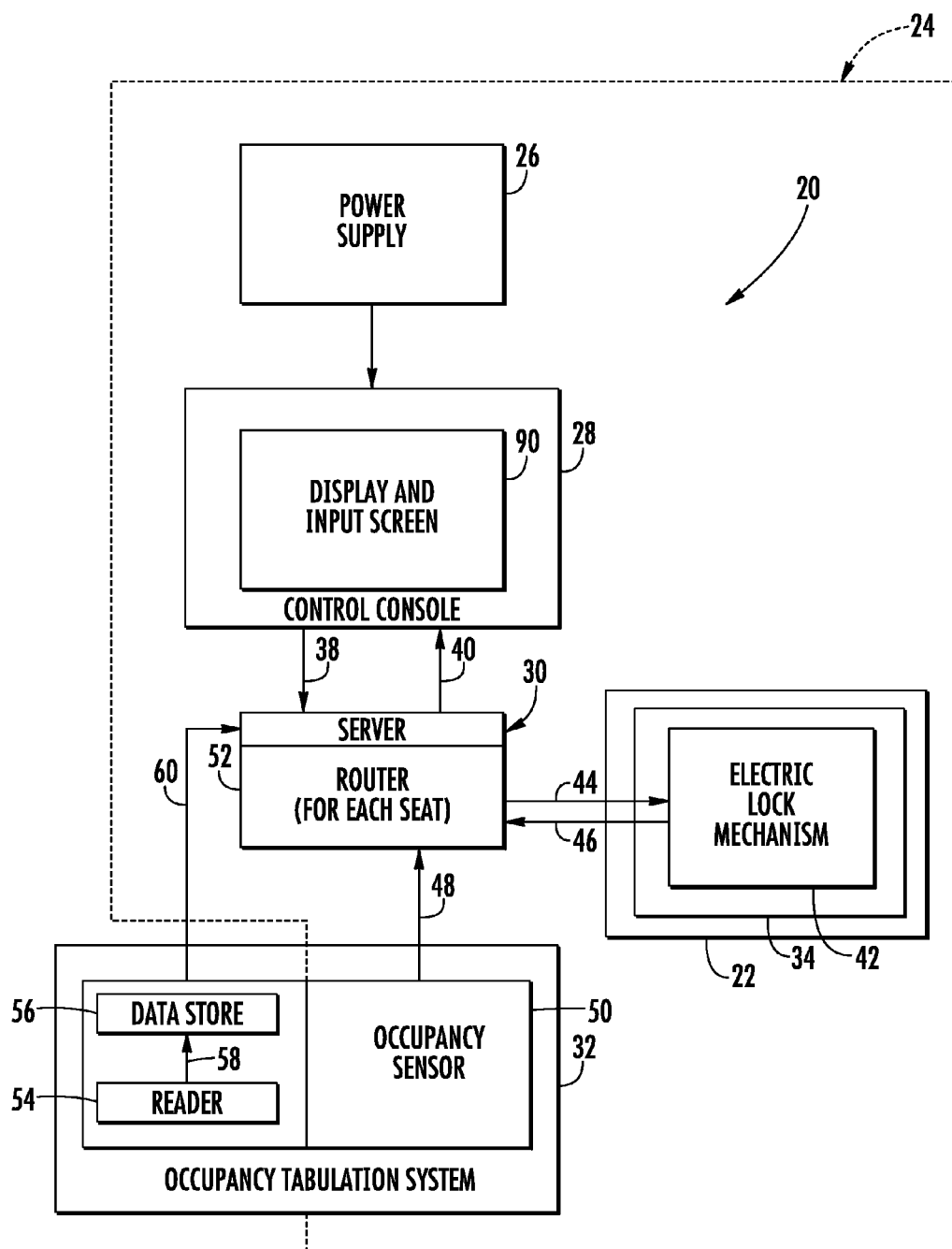
FIG. 1 is a block diagram of the components of an occupant restraint system as one, non-limiting, exemplary embodiment of the present disclosure.

Referring to FIG. 1, an exemplary embodiment of an occupant restraint control system 20 may facilitate a safe and/or efficient means to secure a plurality of occupants in and/or on a plurality of respective occupant residences 22 of a transfer vehicle 24. Although illustrated as an airplane as one example of an aircraft in FIG. 4, the vehicle 24 may also be a bus, an amusement ride or any variety of other vehicles utilized to transport a plurality of occupants, and that may require the use of an attendant. Although illustrated as a seat in FIG. 3, the occupant residence 22 may be any other structure used to position an occupant in any variety of positions and/or confinements.

The occupant restraint system 20 may include a power supply 26, a control console 28, a processor 30, an occupancy tabulation system 32, and a restraint assembly 34. The occupancy tabulation system 32 and the restraint assembly 34 are electronically connected to the console 28 through the processor 30. The console 28 is generally powered by the power supply 26 through at least one line 36. It is further contemplated and understood that redundant control consoles may be present in the vehicle 24 and electronically connected to the common processor 30. For the non-limiting example of an airplane 24, the control consoles 28 may be located at attendant stations and/or in the pilot cockpit.

The control console 28 may send control signals to the processor 30 through line 38 and receives data and/or control signals from the processor through line 40. The processor 30 is programmed to output control signals and/or power to the electric lock mechanisms 42 of the plurality of restraint assemblies 34 through a plurality of respective lines 44 and receives data (i.e., locked state or unlocked state) therefrom through a plurality of respective lines 46. The processor 30 is further adapted to receive occupancy data through a plurality of lines 48 (i.e., occupied state and non-occupied state) from a plurality of occupancy sensors 50 of the tabulation system 32. The processor 30 may include a router 52 having a plurality of ports with each port associated with a respective residence 22, and the associated lock mechanism 42 and occupancy sensor 50. It is further contemplated and understood that at least a portion of the lines may be hardwired, may be multiplexed and/or may be wireless.

The occupancy tabulation system 32 may include the plurality of occupancy sensors 50 with each occupancy sensor 50 being approximate to a respective one of the plurality of residences 22, a reader 54 and an electronic data store 56 that receives output from the reader over line 58. The data store 56 may generally be a tabulation of all occupants entering the vehicle 24, and may be downloaded to the processor 30 when, for example, requested by the control console 28 over line 60 that may be wireless. It is further contemplated and understood that the occupancy sensor 50 may be any variety of sensors capable of detecting when, for example, the occupant is seated. Such sensors may include traditional temperature, pressure and/or light sensors. It is further contemplated and understood that the sensor 50 may, for example, be a combination of light and pressure sensors, where both must sense occupancy. Such a combination may alleviate any potential of false signals incorrectly indicating an occupant is seated. For example, a package may be on a seat that may trick a light sensor, however, unless the package is exceedingly heavy (e.g., over fifty pounds) the pressure sensor (that may have a programmable weight set-point) will not sense occupancy.

Figure 2:
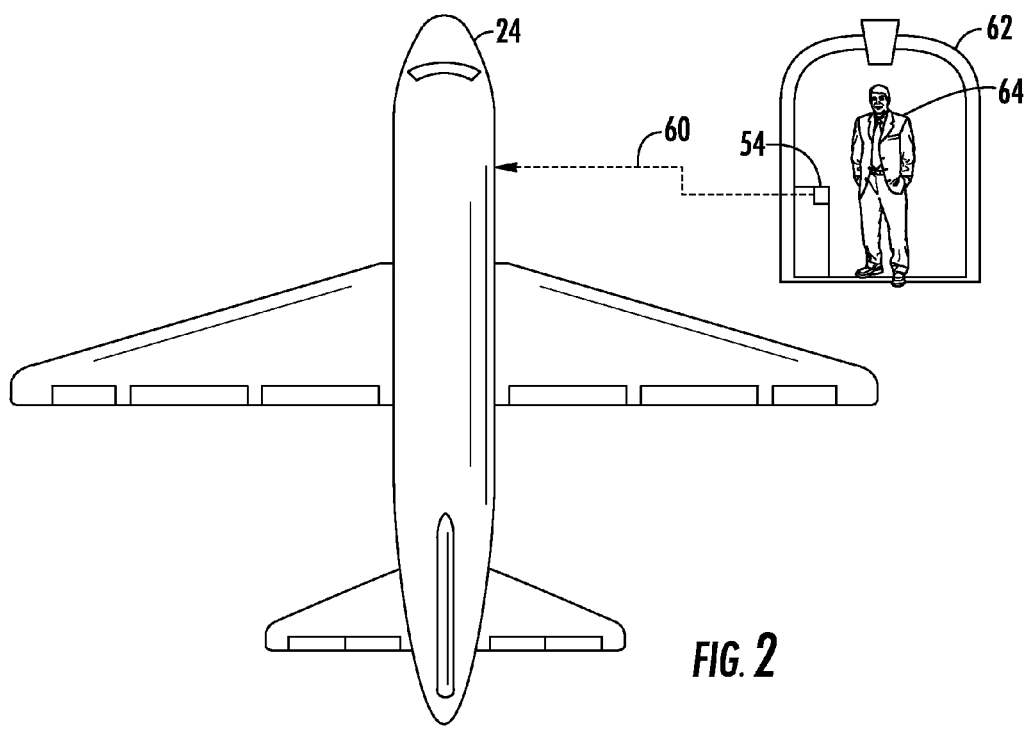
FIG. 2 is a schematic of the system used in an airport environment.

Referring to FIGS. 1 and 2, and as one, non-limiting, example, the vehicle 24 may be an airplane and the reader 54 may be a scanner or bar code reader located remotely from the airplane 24 at a boarding gate 62 of an airport. In operation, the reader 56 may scan a boarding ticket carried by each occupant 64 just prior to boarding the airplane 24. The computer readable data may be a simple count of occupants 64 boarding the airplane 24 or may include additional descriptive data of each occupant. The data store 56 may be generally located in the airport and delivered to the processor 30 wired, or wirelessly, upon command from the control console 28. In the example of an airplane 24 application, the wired or wireless connection between the data store 56 and the processor 30 may be a secured private wired or wireless connection that opens for a brief period necessary to transfer data and closes once a receipt notification from the on-board system is received by the data store 56.

Figure 3:
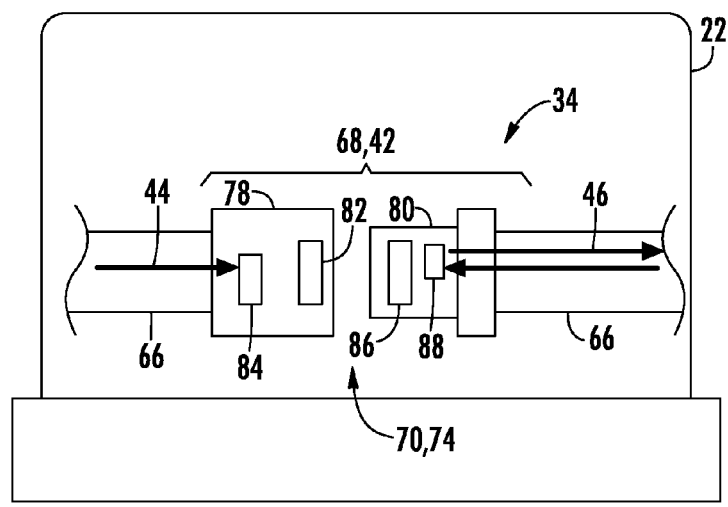
FIG. 3 is a schematic of a restraint assembly of the system illustrated in both an unlatched and unlocked state.
Figure 4:
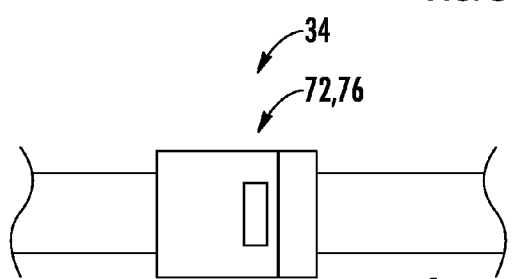
FIG. 4 is a schematic of the restraint assembly illustrated in both a latched and locked state.

Referring to FIGS. 1 and 3-4, each restraint assembly 34 may include a restraint member 66, latch mechanism 68 manually movable between an unlatched state 70 and a latched state 72, and the electric lock mechanism 42 movable between an unlocked state 74 and a locked state 76. Generally, the latch mechanism 68 is manually operated by the occupant 64 and may not be directly monitored by the control console 28. The electric lock mechanism 42 is operatively integrated with the latch mechanism 68 such that the lock mechanism is physically unable to move from the unlocked state 74 to the locked state 76 if the latch mechanism 68 is not in the latched state 72.

As one, non-limiting, example, the restraint member 66 may be a flexible seat belt and the latch mechanism 68 may generally be a seat belt buckle having a female portion 78 and a detachable male portion 80 via a spring loaded button or actuator 82 mounted to the female portion 78. The electric lock mechanism 42, may as one non-limiting example, be an electromagnetic lock mechanism having an electromagnet 84 mounted generally inside the female portion 78, an armature plate 86 generally integrated into the male portion 80, and a magnetic proximity sensor or reed switch 88 that may be mounted to the male portion 80.

In operation, the restraint member 66 is manually buckled (i.e., moved from the unlatched state 70 to the latched state 72) by the occupant 64 once self-located in the seat 22. After buckling, the electromagnet 84 may receive power over line 44 and thus firmly engages to the adjacent armature plate 86. The adjacent switch 88 may sense the magnetic field thus closing a circuit that sends a locked signal over line 46 to the control processor 30. If the latch mechanism 68 is not in the latched state 70, the armature plate 86 and switch 88 are not adjacent to the electromagnet 84, thus the lock mechanism 42 will not move to the locked state 76.

Figure 5:
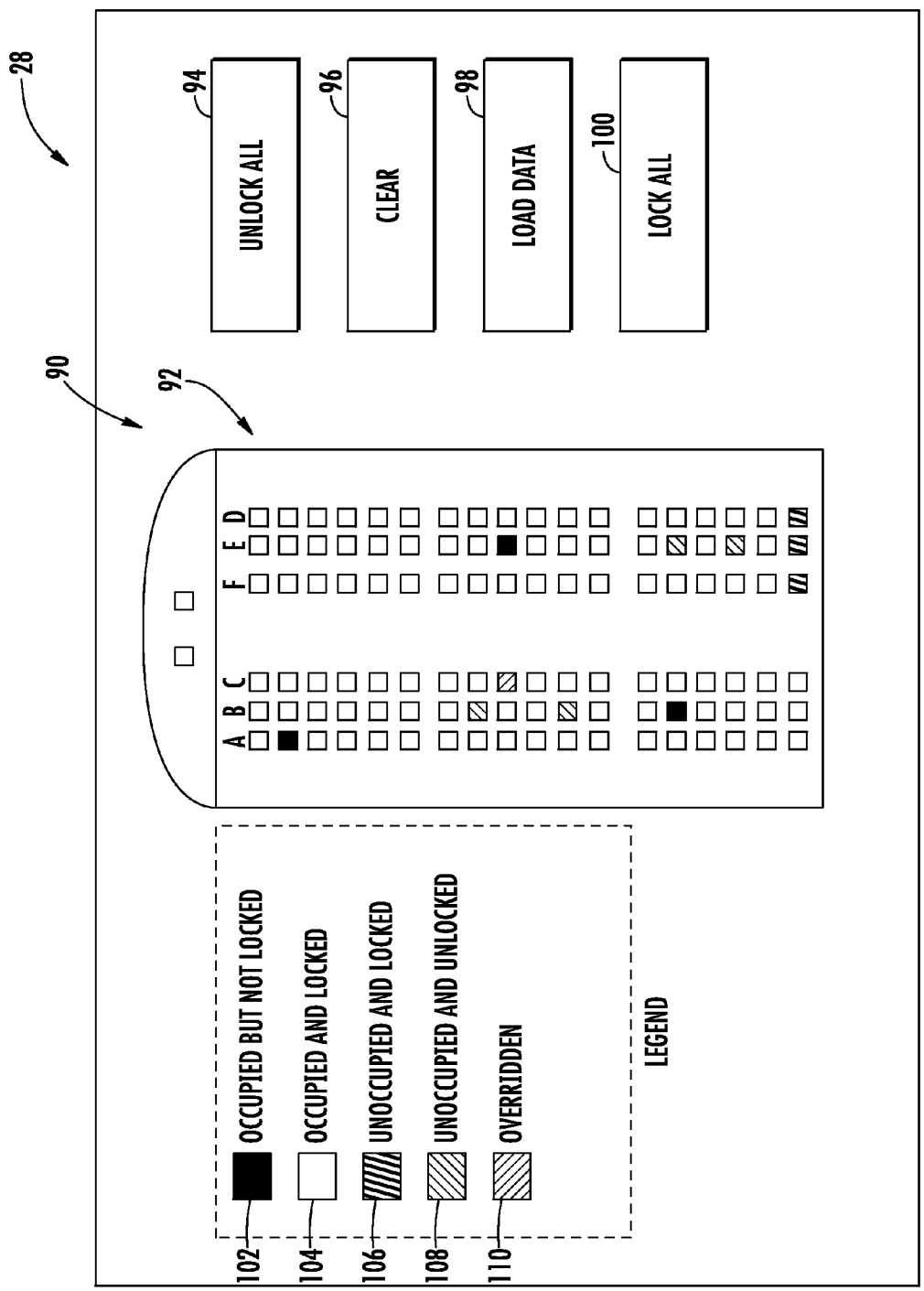
FIG. 5 is a front view of a display and input screen of a control console of the system.

Referring to FIGS. 1 and 5, the control console 28 may include a display and input screen or user interface 90 that may be a touch screen. The screen may generally include an interactive display of a seating layout 92, an unlock-all selector 94, a clear selector 96, a load data selector 98 and a lock-all selector 100 that may illuminate a pre-specified color (e.g. green) when all occupants are properly latched and locked in designated seats. Each seat 22 displayed in the seating layout 92 may illuminate a pre-specified color indicative of the following conditions: red if occupied and not locked 102; white if occupied and locked 104; yellow if unoccupied and locked 106; blue if unoccupied and unlocked 108; and, purple if in an overridden condition 110. It is contemplated and understood that any color coding combinations may be utilized to signify the conditions 102, 104, 106, 108, 110, or other means of alerting an attendant such as specific lettering being displayed, etc.

In operation of the occupant restraint system 20, all occupants 64 may enter the airplane 24 through an airport gate 62 where the ticket of each occupant is scanned by reader 54 with the data stored in data store 56. With all occupants 64 boarded and located in what may be designated seats 22, the occupants may be notified to manually place their latch mechanisms 68 (i.e., buckle) in the latched state 72. During this period, the attendant may initiate the load data selector 98 on the display and input screen 90 that instructs the processor 30 to download the occupancy data from the data store 56 via wireless line or link 60. Also, the occupancy sensors 50 located in the occupied seats will send a signal to the processor 30 via respective routers 52 and send this data to the control console 28 via line 40.

The control console 28 may compare the data store data to the data received from the occupancy sensors 50 to determine if all occupants are seated in their correct seats and to determine if some occupants are not yet seated (i.e. in bathroom, etc.). Although of some benefit, the occupant restraint system 20 will also function without input from the data store 56.

From the seating layout 92, the attendant may efficiently determine what seats are occupied and not locked 102. When the attendant is satisfied that all occupants are seated and manually latched, the attendant may select the lock-all selector 100 to move the lock mechanisms 42 from the unlocked state 74 the locked state 76. If an occupant has not yet latched, the lock mechanism will remain in the unlocked state 74 and the display layout 92 will alert the attendant of an occupied but not locked condition 102 of a particular seat 22. The attendant may then notify the unlatched occupant to latch the mechanism 68 and via the display layout 92, may re-initiate the lock sequence for the particular occupant. When a lock mechanism 42 is in the locked state 76 at a particular seat 22, the locked occupant may be notified of the locked state 76 using a status indicator (e.g., audible and/or visual) on an in-flight entertainment system (not shown) if available, and/or an illuminated indicator (not shown) located to be viewed by the occupant.

The overridden condition 110 of the control console may allow for special circumstances of any pre-selected seat 22. Such circumstances may include the seating location of an air marshall, a malfunctioning restraint assembly 34, and other conditions.

After travel is completed, the attendant may select the unlock-all selector 94 thereby moving the lock mechanism 42 from the locked state 76 to the unlocked state 74. After unlocking, the attendant may notify the occupants that they are free to unlatch the latch mechanisms 68. After travel completion, the attendant may also select the clear selector 96 to clear the control console for preparation of the next flight. Alternatively, the system 20 may be programmed to include an auto cleaning and/or overriding the previous data when new valid data is entered.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. An occupant restraint system for a vehicle comprising:
a plurality of occupant residences disposed in the vehicle, and each including a restraint assembly having a latch mechanism manually movable between a latched state and an unlatched state and an electric lock mechanism movable from an unlocked state to a locked state when the latch mechanism is in the latched state;
a control console disposed in the vehicle, and including an electronic display of the plurality of occupant residences and a user interface for actuating the electric lock mechanism between the locked state and the unlocked state; and
an occupancy tabulation system located remotely from the vehicle, and constructed and arranged to send a signal to the control console indicative of occupied residences of the plurality of occupant residences for displaying an occupied condition associated with the occupied residences on the electronic display, wherein the electric lock mechanism is integrated into the latch mechanism, the electric lock mechanism is constructed and arranged not to lock when the latch mechanism is in the unlatched state, and the occupancy tabulation system includes a plurality of occupancy sensors with each occupancy sensor associated with a respective one of the plurality of occupant residences, and each occupancy sensor is constructed to initiate an occupied signal to the control console.

2. The occupant restraint system set forth in claim 1, wherein the occupancy tabulation system includes a bar code reader constructed and arranged to identify each occupant.

3. The occupant restraint system set forth in claim 2, wherein the occupancy tabulation system includes a data store that receives input from the bar code reader and a wireless connection for downloading the data store to the control console.

4. The occupant restraint system set forth in claim 1, wherein the electric lock mechanism includes an electromagnet.

5. The occupant restraint system set forth in claim 1, wherein the restraint assembly includes a flexible belt and a latchable buckle that includes the latch mechanism and the electric lock mechanism.

6. The occupant restraint system set forth in claim 5, wherein the plurality of occupant residences is a plurality of airplane seats.

7. The occupant restraint system set forth in claim 1, wherein the user interface includes an all-unlock selector for placing all of the electric lock mechanisms in the unlocked state.

8. The occupant restraint system set forth in claim 1, wherein the occupant restraint system is generally in a vehicle and the user interface includes a clear selector for clearing all data after travel completion.

9. The occupant restraint system set forth in claim 3, wherein the user interface includes a load data selector for loading data from the data store to the control console.

10. The occupant restraint system set forth in claim 1 comprising:
a processor for receiving and sending control signals from and to the control console and from and to the electric lock mechanism of each one of the plurality of occupant residences.

11. The occupant restraint system set forth in claim 10, wherein the processor includes a router having a plurality of ports with each port associated with the electric lock mechanism of a respective one of the plurality of occupant residences.

12. The occupant restraint system set forth in claim 3 comprising:
a processor for receiving and sending control signals from and to the control console, and wherein the processor includes a router having a plurality of ports with each port associated with the electric lock mechanism of a respective one of the plurality of seats and a respective one of the plurality of occupancy sensors.

13. A method of operating an occupant restraint system in a vehicle comprising the steps of:
identifying occupied seats disposed in the vehicle via an electrical occupancy tabulation system located remotely from the vehicle;
receiving seat occupancy data from the electrical occupancy tabulation system into a control console via a computer processor;
displaying the occupied seats on an electronic display of the control console;
notifying occupants to manually place a latch mechanism of a restraint assembly into a latched state;
remotely placing a lock mechanism of the restraint assemblies in the latched state into a locked state via a user interface of the control console;
displaying occupied seats that are not in the locked state on the electronic display of the control console; and
notifying the occupant in one of the occupied seats and with a lock mechanism not in the locked state to place the latch mechanism in a latched state, wherein the electrical occupancy tabulation system includes an occupancy sensor placed in each one of the plurality of seats.

14. The method set forth in claim 13 comprising the further step of:
operating a selector on the user interface to place all lock mechanisms in an unlocked state;
manually placing the latch mechanism into an unlatched state by the occupant; and
disembarking from the occupied seat by the occupant.

15. The method set forth in claim 13, wherein the electrical occupancy tabulation system includes a bar scanner that inputs data into a data store.

* * * * *